April 25, 1939.  C. R. HARKINS  2,155,898
FISHHOOK EXTRACTOR
Filed March 15, 1937
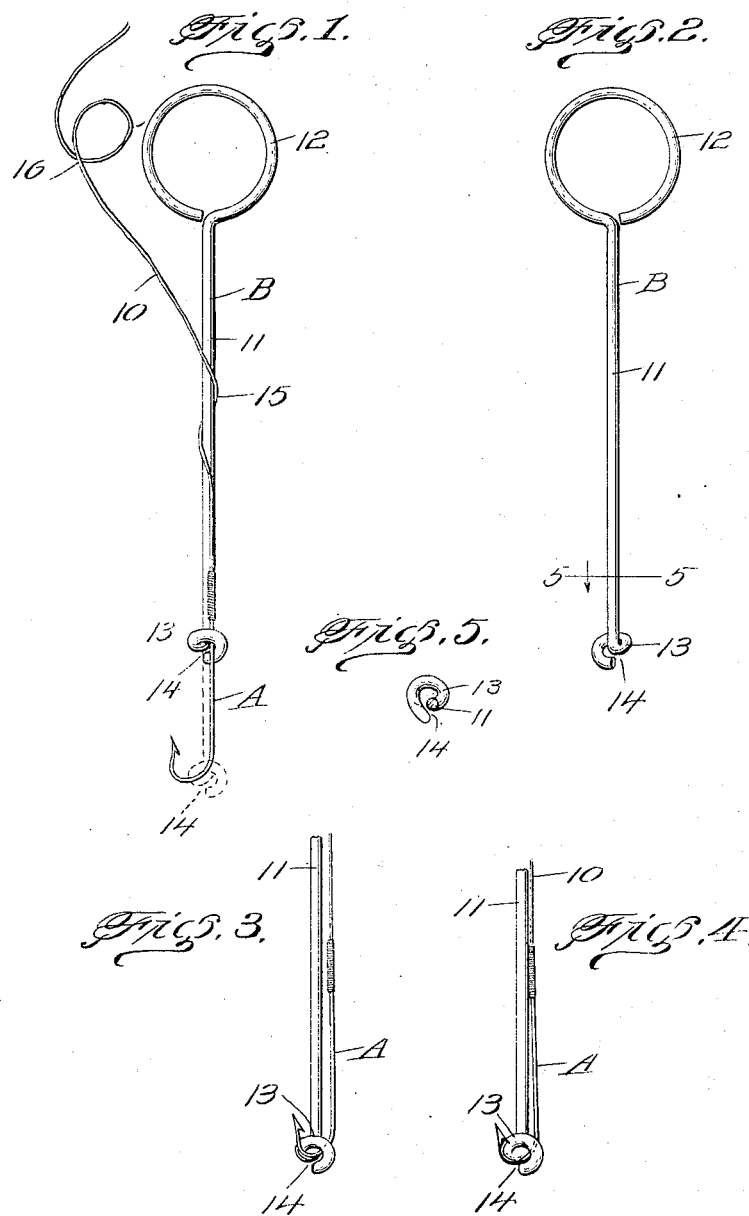
Charles R. Harkins.
INVENTOR
BY Victor J. Evans & Co.
ATTORNEYS Patented Apr. 25, 1939

2,155,898

UNITED STATES PATENT OFFICE 2,155,898

FISHHOOK EXTRACTOR

Charles R. Harkins, Flint, Mich.

Application March 15, 1937, Serial No. 131,059

1 Claim. (Cl. 43—29)

The invention relates to a fish hook extractor and more especially to a fish hook disgorger.

The primary object of the invention is the provision of a device of this character, wherein the fish hook can be conveniently and easily extracted from the mouth of a fish when caught thereby and in this manner facilitating and rendering easy the withdrawal of the hook from the throat or mouth of the fish.

Another object of the invention is the provision of a device of this character, wherein a fisherman is relieved from the possibility of injury by hand extraction of the fish hook from the mouth of a fish when caught in that such hook can be conveniently and easily extracted and removed from the mouth of the fish irrespective of the way in which the hook is engaged within the mouth of such fish.

A further object of the invention is the provision of a device of this character, wherein a swallowed or a deep-set hook within the mouth or throat of a fish can be removed or extracted with dispatch and without injury to a fisherman as the placing of the fingers in the mouth of the fish will be avoided.

A still further object of the invention is the provision of a device of this character, which is simple in construction, thoroughly reliable and effective in operation, of a size enabling convenient carrying thereof by a person or within a fishing outfit, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation of the device constructed in accordance with the invention showing by full lines the initial position thereof with respect to a fish hook and by dotted lines the final or extracting position with relation to said hook.

Figure 2 is an elevation of the device.

Figure 3 is a fragmentary elevation showing the final position of the device with respect to a fish hook for the extraction of the latter from the mouth of a fish.

Figure 4 is a view similar to Figure 3 showing the stage of detachment of the fish hook from the device.

Figure 5 is a transverse sectional view taken on the line 5—5 of Figure 2 and viewed in the direction indicated by the arrow.

Similar reference characters indicate corresponding parts throughout the several views in the drawing. Referring to the drawing in detail, A designates generally a fish hook as usual having the hanger length of gut 10 or other connector for fastening to a fishing line (not shown) while B designates generally the extractor or fish hook disgorger constituting the present invention and hereinafter fully described.

The disgorger or extractor comprises a straight shank 11 made from relatively stiff wire having at one end of said shank an eye or ring-like terminal 12 while at the other end is a single convolute or coil 13 presenting an open side or portion 14 thereto so that the hook A can be engaged with the coil or convolute 13 through the open side 14 to be loosely embraced by said convolute or coil when the device is in use for extracting the hook A from the mouth or throat of a fish.

In the use of the device assuming that the hook A has been carried into the convolute or coil 13 and that the gut 10 has been twisted at 15 about the shank 11 and also that this gut is looped at 16 about the finger of an operator of the device with the convolute or coil 13 initially raised on the stem portion of the said hook A and assuming that the hook has lodged in the mouth or throat of a fish and the device has been engaged as previously stated by holding tight on the gut 10 and pushing the shank 11 in the direction of the bill of the hook A the convolute or coil 13 will press upon the tissues of the throat or mouth of the fish withdrawing the hook or extracting the latter therefrom and thus relieving the operator of the device or the fisherman from placing the fingers in the mouth or throat of the fish when caught on the hook A and thereby avoiding possible injury from contact with the hook.

The open convolute or coil 13 permits quick and easy attachment of the device to the hook or the removal of such device therefrom.

What is claimed is:

A fish hook extractor comprising a straight shank forming a manually freely operable handle made from a relatively stiff piece of wire, and a corkscrew-like open eye bent from one end of said shank at an angle thereto for presenting a spread single coil extending eccentrically partially about the axis of said shank, the free end of said coil being curved outwardly away from the same for effecting an uninterrupted spiral way through said coil.

CHARLES R. HARKINS.